United States Patent [19]

Charchian

[11] 4,131,188
[45] Dec. 26, 1978

[54] LUBRICATION ARRANGEMENT FOR A COUPLING DEVICE

[75] Inventor: Loris J. Charchian, Troy, Mich.

[73] Assignee: Dana Corporation, Toledo, Ohio

[21] Appl. No.: 748,585

[22] Filed: Dec. 8, 1976

[51] Int. Cl.² ............................................. F16D 13/74
[52] U.S. Cl. ............................ 192/113 B; 188/264 CC
[58] Field of Search ............... 192/113 B, 58 B, 58 C, 192/105 A; 64/26; 188/264 E, 264 CC

[56] References Cited

U.S. PATENT DOCUMENTS

| | | | |
|---|---|---|---|
| 1,857,016 | 5/1932 | Gotz | 192/105 A |
| 2,708,018 | 5/1955 | Dudley | 64/26 X |
| 2,954,857 | 10/1960 | Palm | 192/58 A |
| 3,002,595 | 10/1961 | Weir | 192/113 B X |
| 3,204,738 | 9/1965 | Marland et al. | 192/113 B |
| 3,247,935 | 4/1966 | Marland | 192/113 B X |

*Primary Examiner*—Benjamin W. Wyche
*Attorney, Agent, or Firm*—Robert E. Pollock; Robert M. Leonardi

[57] ABSTRACT

Disclosed is a coupling device in the form of an overrunning clutch particularly adapted for "holdback", stand-by drive and "creep" drive applications. A one-way clutch means, preferably in the form of a sprag clutch provides selective drive between a normally driven member and a normally passive member. The "passive" member may be retained against any rotation or may be driven at any speed less than that of the normally driven member. In the illustrated embodiment the normally driven member comprises a sleeve adapted to accept a shaft. The sleeve is drivingly connected to the outer race of the one-way clutch. The inner race of the overrunning clutch is fixed to a housing for the assembly and serves as the passive drive member. Means are provided thereon for connection to a stationary member or an auxiliary drive. The passive member is supported on the normally driven member by a pair of bearing means one on either side of the one-way clutch. One bearing means is supported on the exterior of the normally driven means and one is supported within said means. A lubrication system is provided which includes a fill plug, a level check plug and a vent plug in the housing.

4 Claims, 3 Drawing Figures

LUBRICATION ARRANGEMENT FOR A COUPLING DEVICE

BACKGROUND OF THE INVENTION

Various types of coupling devices such as one-way clutches have been known for many years. Typical application of such clutches are as "holdbacks", for stand-by drives and "creep" drives. In each of these applications one member of the clutch is normally driven and the other member is normally passive. Various one-way clutch mechanisms such as sprag, cam and ratchet clutch members join the two clutch members and provide selective drive therebetween. In a holdback arrangement, the normally passive clutch member is fixed against rotation and the normally driven member is free to rotate in one direction, for example by the headshaft of an inclined conveyor. Should the conveyor drive fail the holdback prevents the shaft, and thereby the conveyor, from running in reverse. In a stand-by drive arrangement two drive means are provided each capable of driving the load, typically at substantially equal speeds. When the normal drive stops for any reason the clutch provides a driving connection to allow the stand-by drive to pick up the load. A creep drive operates similarly except that the alternate drive operates at a substantially lower speed than the normal drive.

While there exists a variety of designs of couplings there is a continuing need for new designs to fit particular applications. The present invention is particularly directed to the mounting and environmental problems which exist in some applications and provides a particularly advantageous lubrication arrangement therefor.

SUMMARY OF THE INVENTION

The coupling of the present invention is particularly adapted for mounting on a shaft which is normally driven and includes provision for connection to, for example, a normally passive member to provide a holdback, creep drive or stand-by drive function. The clutch is sealed to the maximum possible extent and has only one entry path for contaminants. In a preferred embodiment a multiple seal including a labyrinth, a grease pocket and grease seal and an oil seal is provided.

The clutch includes a normally driven or input member which is adapted for connection to a driving input. A second member is drivingly associated with the input member and may include, for example, a means forming the inner race or clutching member of a clutch which connects the two members. The second member provides a housing which encases the driving connection and is sealingly associated with the input member.

DESCRIPTION OF THE PREFERRED EMBODIMENT

Figure 1:
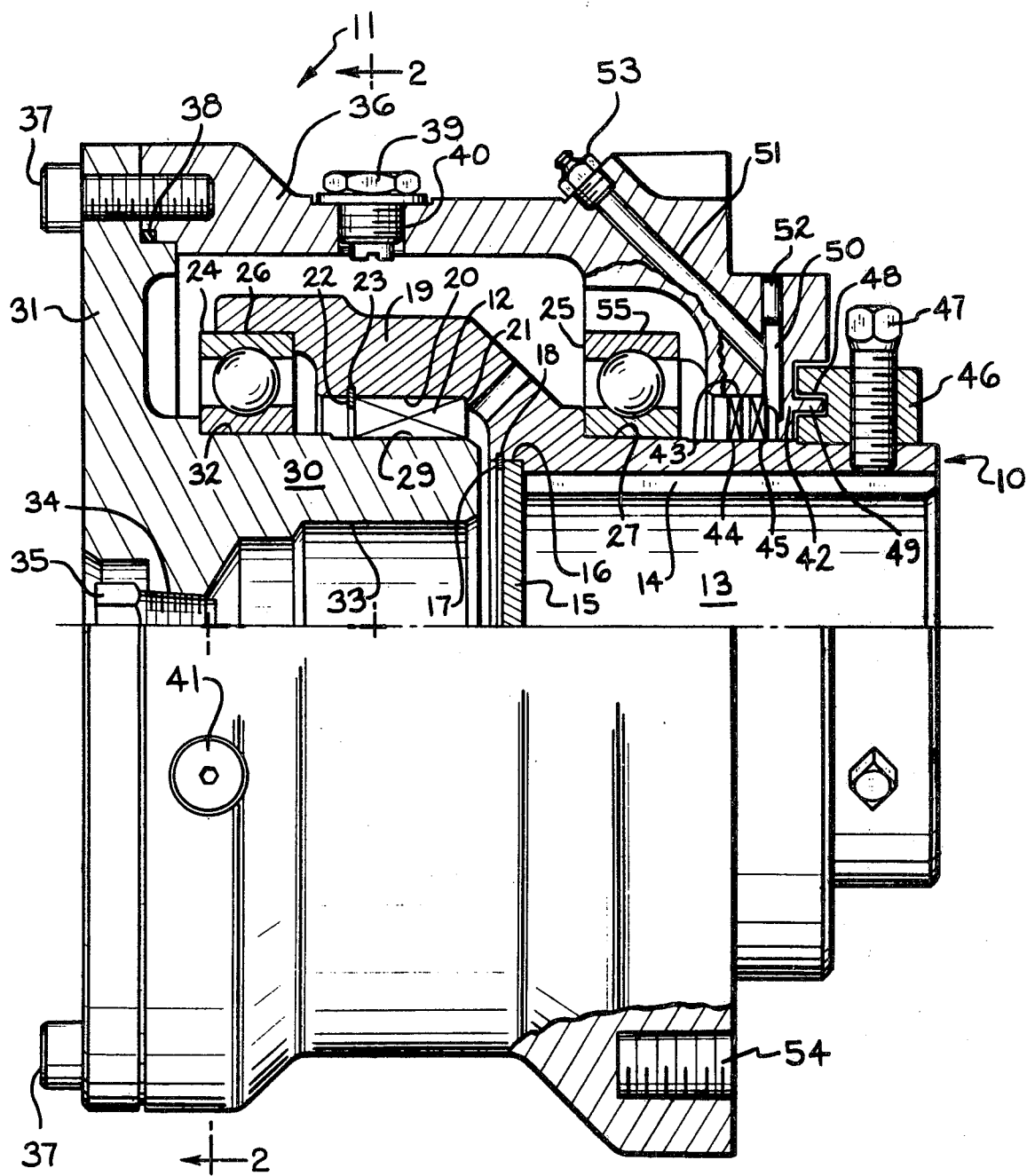
FIG. 1 is an elevation view, partially cut away for clarity of a preferred embodiment of the invention.
Figure 2:
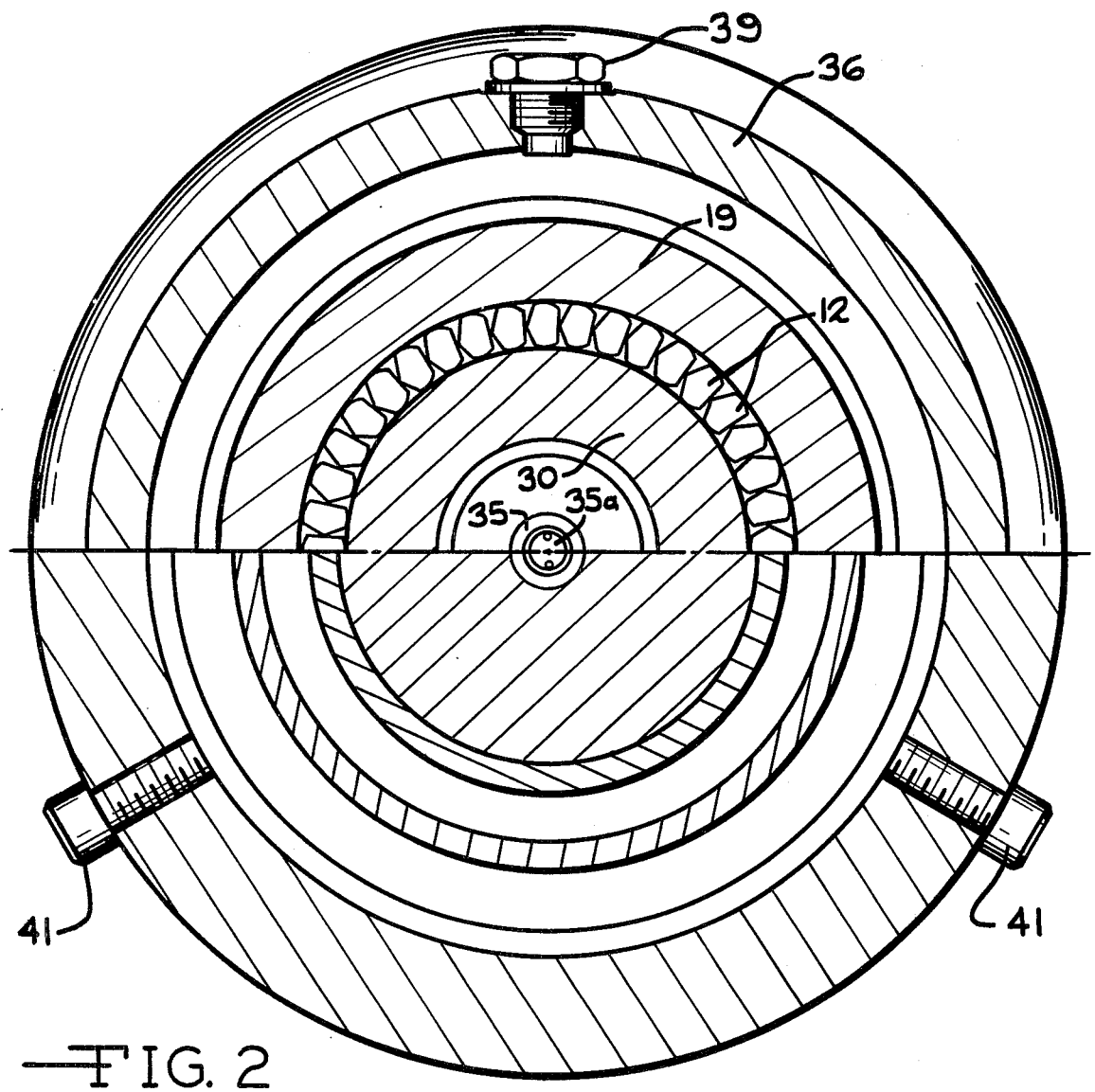
FIG. 2 is a sectional view taken along line 2—2 of FIG. 1.

The lubricating arrangement for a coupling of the present invention is illustrated in the context of a clutch which consists broadly of three parts: a normally driven or input member, designated generally as 10; a normally passive member designated generally as 11 and a one-way clutch means shown in the form of a sprag clutch 12 therebetween.

The input member 10 comprises a means adapted to accept an input drive in the form of a cylindrical pocket 13 for receiving a shaft and a keyway 14 to accept a key and provide a driving connection with the shaft. The pocket 13 is closed at its interior end by any suitable means preferably by a cylindrical plate 15 tightly and sealingly fitting in an annular groove 16 in the input member 10 of a diameter sufficient to extend radially beyond the keyway 14. A snap ring 17 in a mating groove 18 or any other suitable means is used to secure the plate 15 in place.

The input member 10 includes an extension preferably integral therewith which serves as the outer race of the clutch. The extension 19 includes an interior surface 20 to coact with the clutch member 12. for use with the illustrated sprag clutch 12 the surface 20 is a smooth cylindrical surface. Sprag assembly 12 or other clutching member if used is retained between a shoulder 21 in the extension 19 and a snap ring 22 in groove 23.

The clutch member 20 is, as mentioned, preferably a sprag type clutch and can be, for example, of the general type disclosed in U.S. Patent 3,302,761 commonly assigned herewith, the disclosure thereof being incorporated herein by reference. Preferably the particular sprag design employed is such as to provide "centrifugal throwout" as is known in the art. More particularly a centrifugal throwout type sprag is one which is driven by and with the outer race for the clutch and has its center of gravity so positioned with respect to its pivot point on the outer race as to cause the sprag to be tipped by centrifugal force out of contact with the inner race when being driven by the outer race.

A pair of bearings 24 and 25 support the inner member 10 with respect to the outer member 11 and provide suitable spacing therebetween for the clutch member 12. For load distribution and simplicity of construction it is preferable to have the bearings 24 and 25 of equal size. Accordingly a bearing receiving groove 26 is provided at the inner end of the extension 19 and a bearing receiving shoulder 27 is provided on the exterior of the input member 10 and on the opposite side of the clutch member 12 from the groove 26.

The inner race of the clutch member is provided by cylindrical exterior surface 29 on a tubular sleeve 30 which is affixed to and preferably integral with the cylindrical end plate 31. Sleeve 30 also includes an annular bearing receiving shoulder 32 to support the bearing 24 and thereby the input member 10. The sleeve 30 includes an interior pocket defined by wall 33 which provides a substantial interior volume to the overall clutch to accommodate cooling oil.

Figure 3:
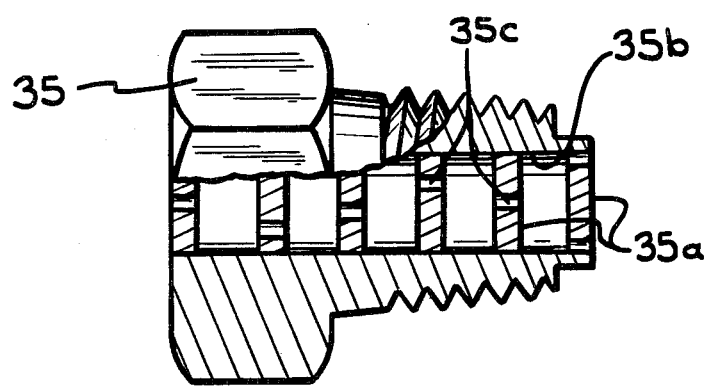
FIG. 3 is an enlarged view of the vent plug shown in FIG. 1 partially broken away to illustrate details in construction.

The end plate 31 is drilled and tapped at 34 on the central axis thereof to accept a vent plug 35 having a labyrinth passage therethrough to allow the clutch to breath while substantially excluding contamination. As seen in FIG. 3, the labyrinth passage is conventional in design and is shown including a plurality of spaced disks 35a provided in a bore 35 extending through the vent plug 35 with the disks having staggered openings 35c passing therethrough. End plate 31 is secured to an outer housing member 36 preferably by a plurality of bolts 37 (only two of which are shown for clarity) which facilitate assembly of the overall structure. An oil seal ring 38 is clampingly secured between the end plate 31 and housing member 36 for oil retention. Oil fill plug 39 fits in a tapped hole 40 in the housing 36 and a fill level check plug 41 is also provided in the side of the housing 36 at the desired oil fill level. There can be one or two oil fill level check plugs 41 and preferably are two located on either side of the coupling (as seen in end view) and opposite one another at the same elevation when the oil fill plug 39 is upright for filling.

The housing 36 also includes a radially directed portion which includes a bearing seat 55 and a collar portion 42 which fits closely around the input member 10 with a spacing on the order of 0.005 inch. An interior groove 43 in the collar 42 accommodates seals 44 and 45 which seal the oil within the assembly and seal the grease gallery, to be described, respectively.

A set collar 46 is affixed to the input member 10 by a plurality of fasteners in the form of bolts 47. The collar includes an annular groove 48 on the clutch side thereof which accepts a tongue 49 which extends from the collar 42 thereby forming a labyrinth grease seal. Passageways 50 and 51 are provided in the collar 42 and are closed by drive pin 52 and grease fitting 53 respectively.

A plurality of bolt holes 54 or other suitable fastening means are provided on the collar 42 and adapted for connection to a stationary member, stand-by drive or the like.

In summary, the present invention provides a coupling assembly wherein the drive connection is enclosed so that only a single sealing path is available for contaminant entry. An oil fill plug breather vent and at least one oil level check plugs are provided on the housing. Various modifications to the structure shown will occur to those skilled in the art with reference to the preferred embodiment which is intended to be illustrative and not limiting.

What is claimed is:

1. A coupling assembly comprising an input driving member and an output driving member generally enclosing said input driving member being sealed therearound, said output driving member forming a generally cylindrical housing said housing having an oil fill opening and plug on the cylindrical surface thereof, at least one oil fill level check opening and plug on the cylindrical surface and angularly displaced thereon relative to said oil fill opening and a vent on the face of said housing generally normal to said cylindrical surface and on the centerline thereof.

2. The assembly of claim 1 including two oil fill level check openings and plugs displaced angularly by an equal amount on either side of said fill plug.

3. The assembly of claim 1 wherein said vent comprises a plug with a labyrinth passageway therethrough.

4. The assembly of claim 3 including two oil fill level check openings and plugs displaced angularly by equal amounts in excess of 90 degrees on either side of said fill plug.

* * * * *